United States Patent [19]
Hiscock

[11] Patent Number: 5,676,534
[45] Date of Patent: Oct. 14, 1997

[54] GEARING BY DEFINITION A DVELJAGIMMAL

[76] Inventor: Donald Clive Hiscock, C/- 12 Isobel Street, Rotorua, New Zealand

[21] Appl. No.: 433,413
[22] PCT Filed: Nov. 29, 1993
[86] PCT No.: PCT/NZ93/00121
§ 371 Date: Jul. 14, 1995
§ 102(e) Date: Jul. 14, 1995
[87] PCT Pub. No.: WO94/12764
PCT Pub. Date: Jun. 9, 1994

[30] Foreign Application Priority Data

Nov. 27, 1992 [NZ] New Zealand ............... 245292

[51] Int. Cl.$^6$ .................................... F01C 17/02
[52] U.S. Cl. ............................ 418/36; 475/332
[58] Field of Search ................. 418/36; 475/220, 475/230, 332; 74/52

[56] References Cited

U.S. PATENT DOCUMENTS

| | | |
|---|---|---|
| 4,788,952 | 12/1988 | Schönholzer . |
| 4,879,924 | 11/1989 | Holthoff et al. ............ 475/332 |
| 4,957,474 | 9/1990 | Kemper ..................... 475/330 |
| 5,203,858 | 4/1993 | Seymour-Chalk ............. 418/36 |

FOREIGN PATENT DOCUMENTS

| | | |
|---|---|---|
| 987989 | 3/1965 | United Kingdom . |
| 1028098 | 5/1966 | United Kingdom . |
| 1034023 | 6/1966 | United Kingdom . |
| 1031626 | 6/1966 | United Kingdom . |
| 1410498 | 10/1975 | United Kingdom . |
| 1419043 | 12/1975 | United Kingdom . |
| 2251655 | 7/1992 | United Kingdom . |
| 8601255 | 2/1986 | WIPO . |

OTHER PUBLICATIONS

Abstract of New Zealand Patent Specification No. 232098 (Donald Clive Hiscock) of Jan. 12, 1990, published in *New Zealand Patent Office Journal*, No. 1364, vol. 81, Issue No. 12, p. 1828, Issued on Jan. 27, 1993.

*Primary Examiner*—Charles G. Freay
*Attorney, Agent, or Firm*—Ware, Fressola, Van Der Sluys & Adolphson LLP

[57] ABSTRACT

A dveljagimmal device (1) serving as a control mechanism and a gearing suitable for use in conjunction with a rotary machine of the "cat and mouse" type. The device (1) comprises a stationary housing (2) from which extends a first (3) and second (4) shaft, the shafts (3,4) being coaxial. The device (1) is characterized in that the second shaft (4) terminates in a frame (5) which rotates in company with rotation of the second shaft (4). The device (1) further comprises a first (6) and a second (7) annular bevel gear, which first (6) and second (7) annular bevel gears are fixedly mounted to the housing (2), are coaxially aligned with the first (3) and the second (4) shafts, and are spaced apart allowing the frame (5) to be freely rotatable therebetween. A first (8) and second (9) pinion gear are basically mounted in the frame (5) with an axis of rotation offset from the perpendicular to the common axis of the first (3) and second (4) shafts, such that the first pinion gear (8) is in engagement with the first annular bevel gear (6) only and the second pinion gear (9) is in engagement with the second annular bevel gear (7) only. When the second shaft (4) and the frame (5) rotate, the first (8) and second (9) pinions are in engagement with their respective annular bevel gear (6,7) and rotate in the same direction, there being a gimmal (10) mounted in the frame (5) between the pinion gears (8,9) in engagement with the first shaft (3) to cause an irregular motion and period of dwell in the motion of the first shaft.

31 Claims, 8 Drawing Sheets

GEARING BY DEFINITION A DVELJAGIMMAL

TECHNICAL FIELD

This invention relates to a gearing for use in connection with a rotary machine, and more particularly relates to what may be correctly described as by definition a "dveljagimmal"—being a combination of the Norse origin word "dvelja" (meaning "dwell" or "slight regular pause in motion" without necessarily stopping—"to linger" and the word "gimmal" (meaning anything consisting of parts moving within each other and interlocked).

Rotary machines to which this invention are applicable include rotary steam engines, rotary pumps and, importantly, rotary internal combustions engines, all of the type known as "cat and mouse" machines.

Such rotary machines typically comprise a pair of piston assemblies having at least double wing or vane type pistons radially disposed in a cylinder. The piston assemblies are rotatable about the central axis of the cylinder and fluid or combustion chambers are formed between adjacent cooperating pistons. These pistons are typically connected by way of a control mechanism in a manner whereby, in addition to a common rotary motion, a relative regular oscillatory motion is superimposed thereby causing the chamber created between adjacent cooperating pistons to cyclically enlarge and reduce.

The present invention is particularly directed to control mechanisms and devices for control of the relative oscillatory motion between the pistons of rotary machines, but utilising principles of construction and operation significantly different from those conventionally or previously employed.

BACKGROUND AND PRIOR ART

Rotary machines of the kind referred to generally employ one of two possible operational actions.

The first action involves superimposing on the rotational motion of the first piston a backward and forward cyclical oscillation, relative to the second piston. Examples of rotary machines operating with this action can be found in prior patent specifications numbers GB 987989, GB 1028098, GB 1031626, GB 1034023, and GB 1410498.

The second action involves superimposing a backward and forward cyclical oscillation on the rotational motion of both pistons, phase shifted by 180° with respect to each other so that as the pistons of the first piston assembly rock forward the pistons of the second piston assembly, in relative terms, rock backward to meet them. Prior patent specifications numbers WO 86/01255, GB 1419043 and GB 2251655 describe rotary machines which operate on this action.

Rotary machines are generally of much simpler construction than their reciprocating counterparts, requiring no valves, connecting rods and the like. However, a problem does arise in how to control the relative motion of the pistons to achieve the desired effect.

In this regard, the desired action can be, and has previously been, produced with control mechanisms designed to employ a simple harmonic oscillation derived from the motion of a point rotating about an axis. The principle difficulty in achieving control of the piston relative motion is in turning what is essentially a two dimensional motion, namely, rotation, into a simple backward and forward oscillation.

Many prior art control systems utilise a sliding pin and slot arrangement to produce the simple harmonic oscillation from rotation of the pin on a pinion gear running off a gear mounted on the main shaft of the rotary machine, or some similar arrangement. Patent specifications GB 1034042 and U.S. Pat. No. 4,788,952 provide examples. Other prior art control systems involve complex systems of cranks, connecting rods and/or cams to derive the oscillation. GB 987989, GB 1028098, GB 1031626, GB 1410478 and WO 86/01255 disclose devices in this regard. All of the above noted prior art devices are deficient in at least one or other of the following ways—they include oscillating masses at relatively large distances from the rotational axis creating complex vibration patterns resulting in mechanical inefficiencies, they are unable to cope with high speed operation and/or rapid changes in operating speed, they are subject to high mechanical wear, and they are large and unwieldy relative to the other components.

GB 1419043 represents a different approach. The arrangement provided is a step towards a workable solution, but as is shown in the drawings accompanying this patent specification, notably FIG. 1, the control mechanisms and transmission occupy more space than the rotary machine proper. Moreover, the provision of a single offset pinion wheel (11) at each end of the rotary machine which, as shown in FIGS. 1 and 4 to 7 of the drawings, do not combine to resolve to a zero nett force, produce an unworkable result because of the dynamic imbalance and thus instability.

The transmission and control mechanism device disclosed in GB 2251655 provides a further advance. Notably in this connection, the control mechanism is mounted on the main shaft of the rotary machine and therefore enables a relatively compact unit to be produced. Problems with the mechanism disclosed are that the connecting arms (16) reciprocate, generating an alternating force longitudinally along the main shaft. When the rotary machine operates under the first action noted above significant vibration will occur. This vibration is largely avoided when a second device is mounted on the other side of the machine proper and arranged to operate 180° out of phase. This latter setup causes the rotary machine to operate under the second above noted action. Notwithstanding this, the disclosed device is still undesirable because of the mechanical problems associated with the reciprocating arm system. Further, because of the need for particular ratios between the bevel gear (12) and bevel gears (11) there is a limit to the magnitude of the oscillating which can be transferred to the piston vanes, which thus limits the chamber size of the rotary machine. Finally, having a transmission and control mechanism device mounted on either side of the rotary machine provides disadvantages from the standpoint that assembly and maintenance is difficult, and orientation for practical use of the machine is more difficult.

An entirely new 'first principles' approach to the devising of a control mechanism for rotary machines of the kind referred to was undertaken by the inventor of the present invention, and resulted in the rotary internal combustion engine gearing disclosed in New Zealand patent specification number 232098 which was first published 27 Jan. 1993. This new gearing control mechanism did not utilise an operational action in any way similar to the operational actions mentioned with reference to the prior art existing at the time, and included a housing mounting a pair of similar spaced and opposing fixed bevel gears and having outer parts located one within the other to one side of the housing and arranged for coupling to the pistons of a "cat and mouse" internal combustion engine, and with the outer shaft inner end part mounting a bearing block with a pair of pinions on a transverse inclined axis providing for engagement of one pinion with one bevel gear and the engagement of other pinion with the other bevel gear; the pinions each having half the number of teeth of the bevel gears and being mounted at opposite ends of the bearing block, which locates through and is movable within a transverse slot in an inner enlarged part of the inner shaft, to provide an arrangement whereby rotation of the outer shaft at a constant speed will alternately rotate the inner shaft faster and slower (or slower and faster) and permit a period of substantially stationary motion or "dwell" during each half revolution of the outer shaft so as to produce an irregular motion on one shaft in relation to a regular motion on the other shaft. The shaft motion "dwell" provision is deemed particularly important for the effective operation of "cat and mouse" type rotary machines, but the construction and manner of operation of the gearing control mechanism of specification No 232098 is considered to require improvement and change for more positive and effective motion control, particularly in so far as control of the dwell in motion of the control device shafts is concerned.

The New Zealand specification No 232098 is considered to be the only prior art relevant to the present invention (the previously discussed specifications being only indicative of examples of rotary machines and control mechanisms proposed by others); and it is an object of the present invention to provide an improved control mechanism in the form of a compact gearing assembly serving also as a primary means for causing positive controlled motion variance between cooperating shafts, so as to be suitable for use with a rotary machine of the "cat and mouse" type, in a more positive and significantly different manner to that employed in any known prior art rotary machine control mechanisms.

SUMMARY OF THE INVENTION

In a first broad aspect of this invention there is provided a device in the form of a gearing assembly serving as a control mechanism and primary means for causing motion variance between cooperating shafts suitable for use in conjunction with a rotary machine, the device comprising a stationary housing from which extends first and second shafts, the shafts being coaxial, the device being characterised in that the second shaft terminates in a frame which rotates in company with rotation of the said second shaft, the device further comprising first and second annular bevel gears, which first and second annular bevel gears are fixedly mounted to the housing, are coaxially aligned with the first and second shafts, and are spaced apart allowing the frame to be freely rotatable therebetween, first and second pinion gears mounted in the frame, which first and second pinion gears are coaxial, having an axis of rotation offset from the perpendicular to the common axis of the first and second shafts and the first and second annular bevel gears, such that the first pinion gear is in engagement with the first annular bevel gear only and the second pinion gear is in engagement with the second annular bevel gear only, such that when the second shaft and the frame rotate relative to the stationary housing, the first and second pinions are in engagement with their respective annular bevel gear and rotate in the same direction, there being a gimmal mounted in the frame between the pinion gears in engagement with the first shaft to positively cause an irregular motion and a period of dwell in the motion of the first shaft.

The above noted device provides a significant advance on the prior art, in that it can be in full near (and very close to) dynamic balance. Further, a device constructed as described can be compact, mechanically very strong and long lasting.

Preferably the gimmal comprises a constant velocity joint mounted on and to the first shaft, the constant velocity joint having a first and second projection, the first projection being eccentrically and rotatably connected to the first pinion gear and the second projection being eccentrically and rotatably connected to the second pinion gear.

Desirably the first and second projections are aligned on a common axis, which common axis passes through the centre of the constant velocity joint.

Conveniently the angle of eccentricity of the common axis of the first and second projections relative to the rotational axis of the first and second pinion gears is between 5° and 80°.

Optionally the angle of eccentricity of the common axis of the first and second projections relative to the rotational axis of the first and second pinion gears is between 30° and 60°.

Alternatively the angle of eccentricity of the common axis of the first and second projections relative to the rotational axis of the first and second pinion gears is between 5° and 40°, and expediently between 15° and 25°.

Alternatively the gimmal includes a partially spherical cam track member fixedly mounted to and between the first and second pinion gears, the cam track member including a circular cam track tilted to an angle between the axis of rotation of the first and second pinion gears and the cam track member, and the axis of rotation of the first shaft, the gimmal further including an annular cam follower rotatably mounted in the cam track, the cam follower being pivotably connected to a yoke which in turn is connected to the first shaft.

Desirably the angle of tilt of the cam track relative to the axis of rotation of the spherical member, and thus the first and second pinion gears, is between 10° and 85°. Optionally the angle of tilt is between 30° and 60°. Alternatively the angle of tilt is between 50° and 85°. Expediently the angle of tilt is between 55° and 75°.

In a further embodiment the gimmal can comprise a member pivotably pinned to the first shaft, said member having a first and a second projection, the first projection being eccentrically and rotatably connected to the first pinion gear and the second projection being eccentrically and rotatably connected to the second pinion gear.

Desirably the first and second projections are aligned on a common axis, which common axis passes through the centre of the pivotably pinned member.

Conveniently the angle of eccentricity of the common axis of the first and second projections relative to the rotational axis of the first and second pinion gears is between 5° and 80°.

Optionally the angle of eccentricity of the common axis of the first and second projections relative to the rotational axis of the first and second pinion gears is between 30° and 60°.

Alternatively the angle of eccentricity of the common axis of the first and second projections relative to the rotational axis of the first and second pinion gears is between 5° and 40°, and expediently between 15° and 25°.

Desirably the annular bevel gears and pinion gears are spiral bevel gears.

Preferably the first and second shafts are concentric, with the second shaft being hollow to receive the first shaft.

Conveniently the device includes a third shaft, coaxial with the first and second shafts, connected to the frame, which third shaft extends from the opposite side of the frame to the second shaft.

Advantageously the number of teeth on the annular bevel gears is a binary multiple of the number of teeth on the pinion gears.

Expediently the annular bevel gears have twice as many teeth as the pinion gears.

In a second broad aspect of this invention there is provided a rotary machine incorporating a device according to the preceding aspect, the rotary machine being of the "cat and mouse" type.

Preferably the rotary machine includes two piston assemblies (or one piston assembly and one rotor which for convenience may be considered as a second piston assembly) each having two radially opposed vane type pistons.

Conveniently the first shaft of the device according to the first aspect is directly connected to one piston assembly and the second shaft of the device according to the first aspect is directly connected to the other piston assembly.

Alternatively the rotational movement of the first and second shafts and varying irregular rotary motion of the first shaft are transferred to or from both piston assemblies, at a 180° phase shift, via a differential arrangement.

Expediently the first shaft of the device according to the first aspect is connected to one piston assembly and the second shaft of the device according to the first aspect terminates in circular yoke radially outwardly from which project a plurality of equispaced freewheeling pinion gears, the freewheeling pinion gears being in engagement with two annular bevel gears coaxially mounted, one said annular bevel gear on each of the two piston assemblies.

An advantage of this later arrangement is that the second action noted above can be achieved using only a single control mechanism device.

Preferably the rotary machine is a pump. Alternatively the rotary machine is either an internal combustion engine or a steam engine.

BRIEF DESCRIPTION OF THE DRAWINGS

Presently preferred embodiments of the invention will now be described, by way of example only, with reference to the accompanying drawings, in which.

DESCRIPTION OF THE PREFERRED EMBODIMENTS

Figure 1:
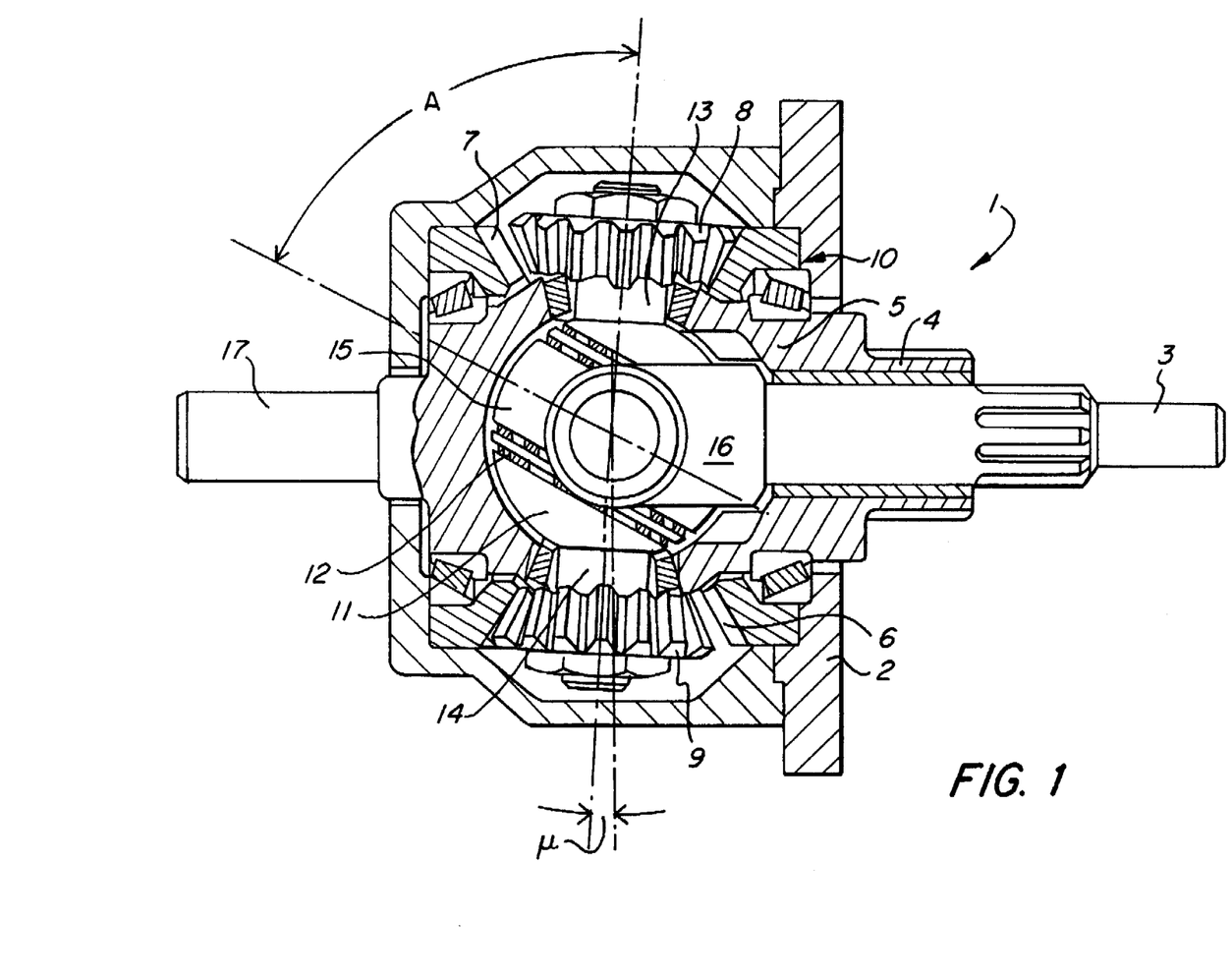
FIG. 1 illustrates a partially sectioned schematic side elevation of a control device according to the present invention.
Figure 2:
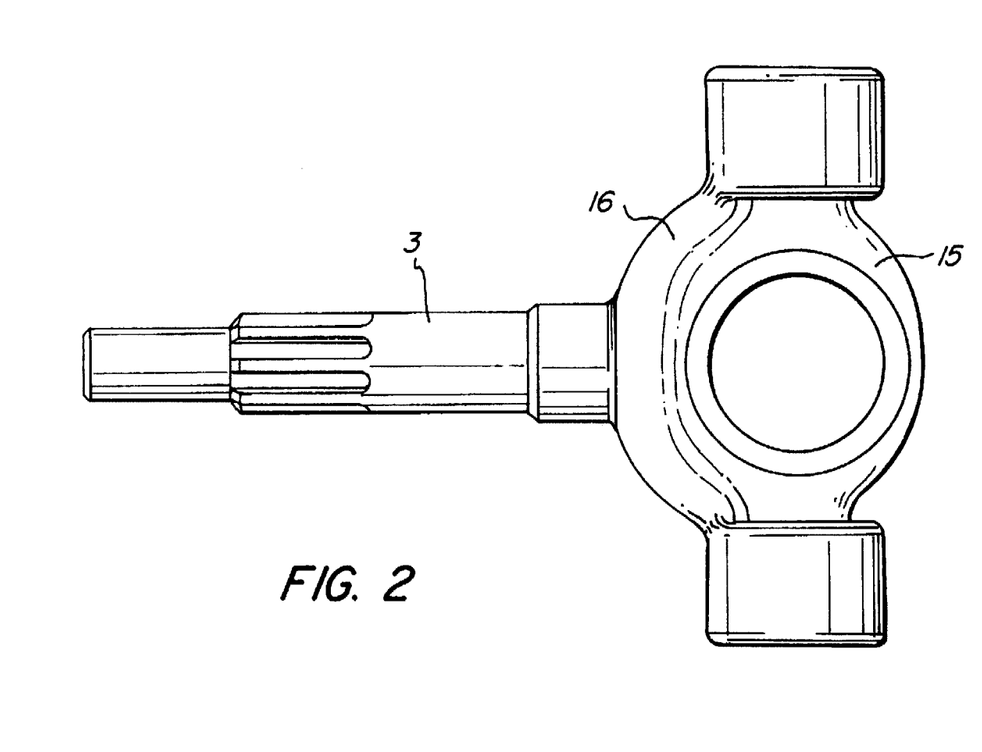
FIG. 2 illustrates a plan view of the cam follower part of the gimmal, yoke and first shaft combination of the device of FIG. 1.
Figure 3:
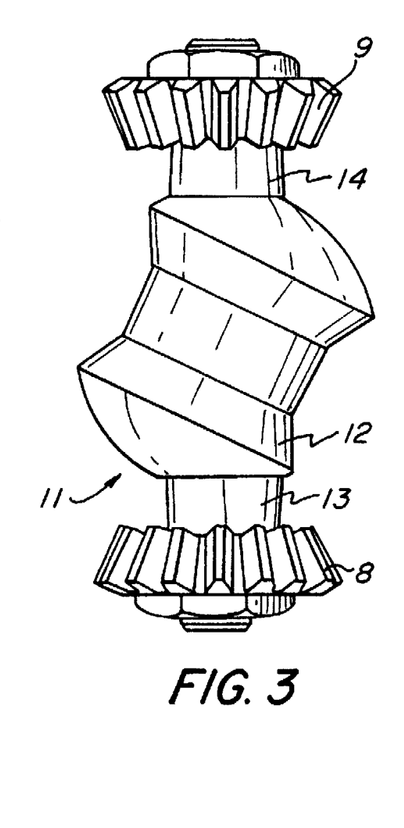
FIG. 3 illustrates a side elevation of the partially spherical gimmal cam track member and pinion combination of the device of FIG. 1.

In a first embodiment of this invention, as shown in FIGS. 1 to 3, there is provided a device, as generally indicated at 1, suitable for use with a rotary machine of the "cat and mouse" type as a motion control mechanism.

Broadly, the device 1 comprises a housing 2 from one side of which extends two shafts 3,4. The shafts 3,4 are coaxial and concentric, with the shaft 4 being hollow and rotatably receiving the shaft 3. One end of the shaft 4 terminates at, and is fixedly mounted to, a rotatable frame 5.

A first 6 and a second 7 annular bevel gear are fixedly mounted to the housing 2, facing each other in coaxial alignment and in coaxial alignment with the shafts 3,4. The gears 6,7 are sufficiently spaced apart to allow the frame 5 to rotate therebetween. A first 8 and a second 9 pinion gear are coaxially mounted in the frame 5 on an axis of rotation offset by an angle $\mu$ from the perpendicular to the axis of rotation of the gears 6 and 7. The angular offset ensures that the pinion gear 8 only engages the annular bevel gear 6, and that the pinion gear 9 only engages the annular bevel gear 7. Thus, as the shaft 4 and frame 5 rotate the pinion gears 8,9 rotate in the same direction.

Mounted between the pinion gears 8,9 is a gimmal 10 in engagement with the shaft 3 and arranged/operable to cause an irregular motion and a period of dwell in motion of the shaft 3 upon rotation of shaft 4 relative to the stationary housing 2.

The gimmal 10 comprises a partially spherical member 11 having a circular cam track 12 recessed therein tilted at an angle A from the rotational axis of the member 11. Stub shafts 13, 14 extend outwardly from opposite sides of the member 11 and are each fixedly connected to a respective one of the pinion gears 8,9. Thus, the pinion gears 8,9 rotate in accompaniment with the cam track member 11.

As shown most clearly in FIG. 2, an annular cam follower 15 is slidably located in the cam track 12. The cam follower 15 is pivotably mounted about its centre line to a yoke 16 which is formed as an extension of the shaft 3.

When the spherical cam track member 11 rotates the tilted circular cam track 12 spins around, with the annular cam follower 15 slidably positioned therein. As the cam follower 15 forces or follows the cam track 12 around angular changes in its orientation in the plane parallel to the shaft 3 are accommodated by relative pivoting between the yoke 16 and follower 15. However, angular changes in orientation in the plane perpendicular to the shaft 3 are resolved into or produced by an irregular rotary motion of the shaft 3.

The device 1 further includes a third shaft 17 fixedly mounted to the frame 5 coaxial with but on the opposite side of the housing 2 from the shafts 3 and 4.

Depending on whether the device 1 is used in conjunction with a rotary pump, or a rotary internal combustion engine or steam engine the shaft 17 will serve as the main input or output shaft. Further in this regard, the shaft 3 has a free end which extends beyond the end of the shaft 4 to enable the respective piston assemblies or piston assembly and rotor (not shown) of a rotary machine (not shown) to be connected to the appropriate shaft 3,4.

Figure 4:
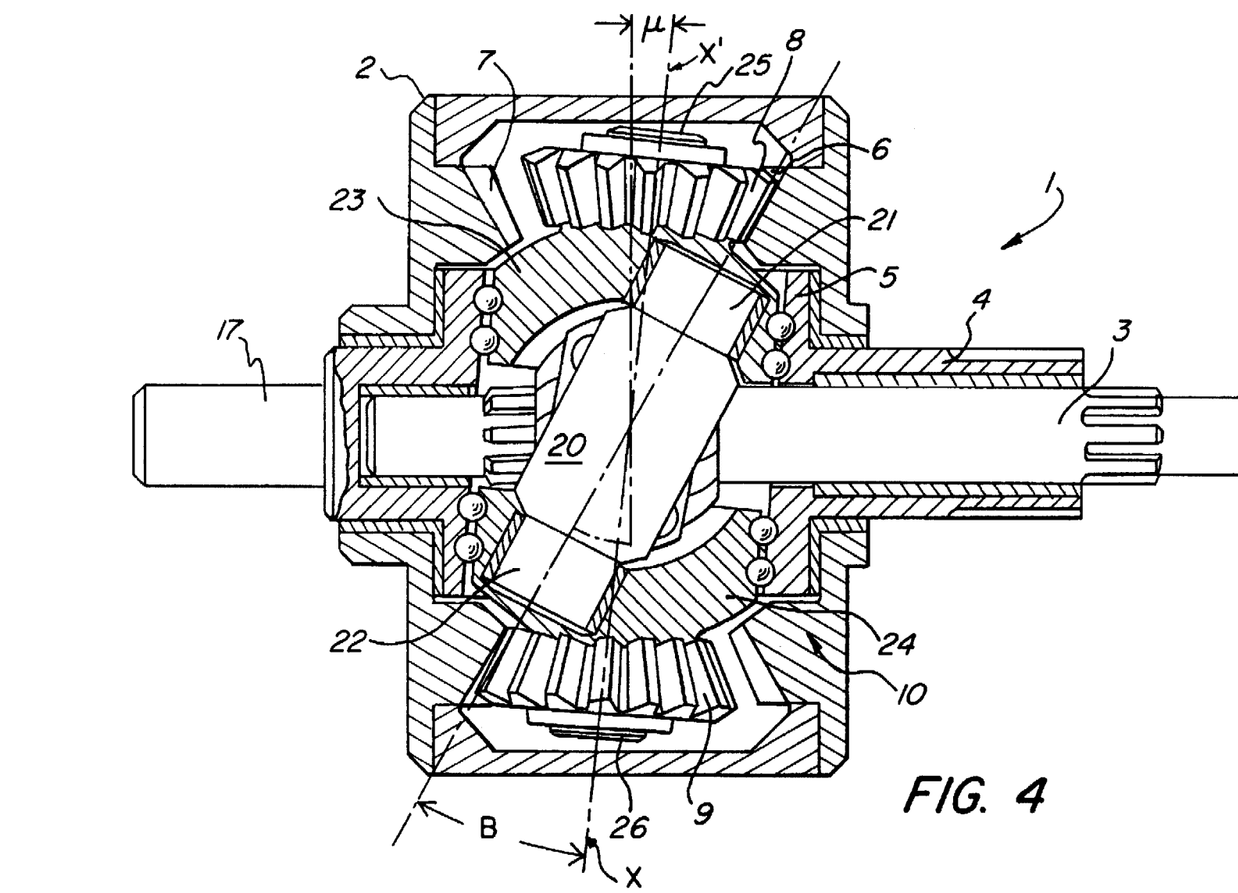
FIG. 4 illustrates a partially sectioned schematic side elevation of an alternative transmission and control device according to the present invention.
Figure 5:
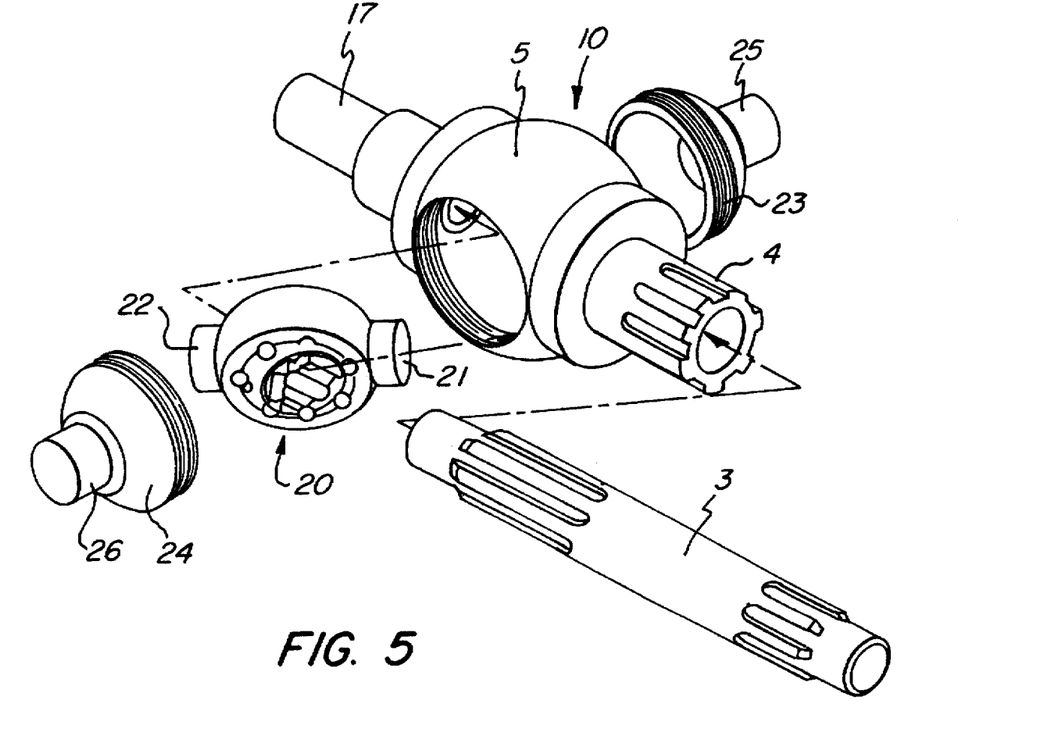
FIG. 5 illustrates an exploded perspective view of the gimmal, first and second shafts, and frame of the device of FIG. 4.
Figure 6:
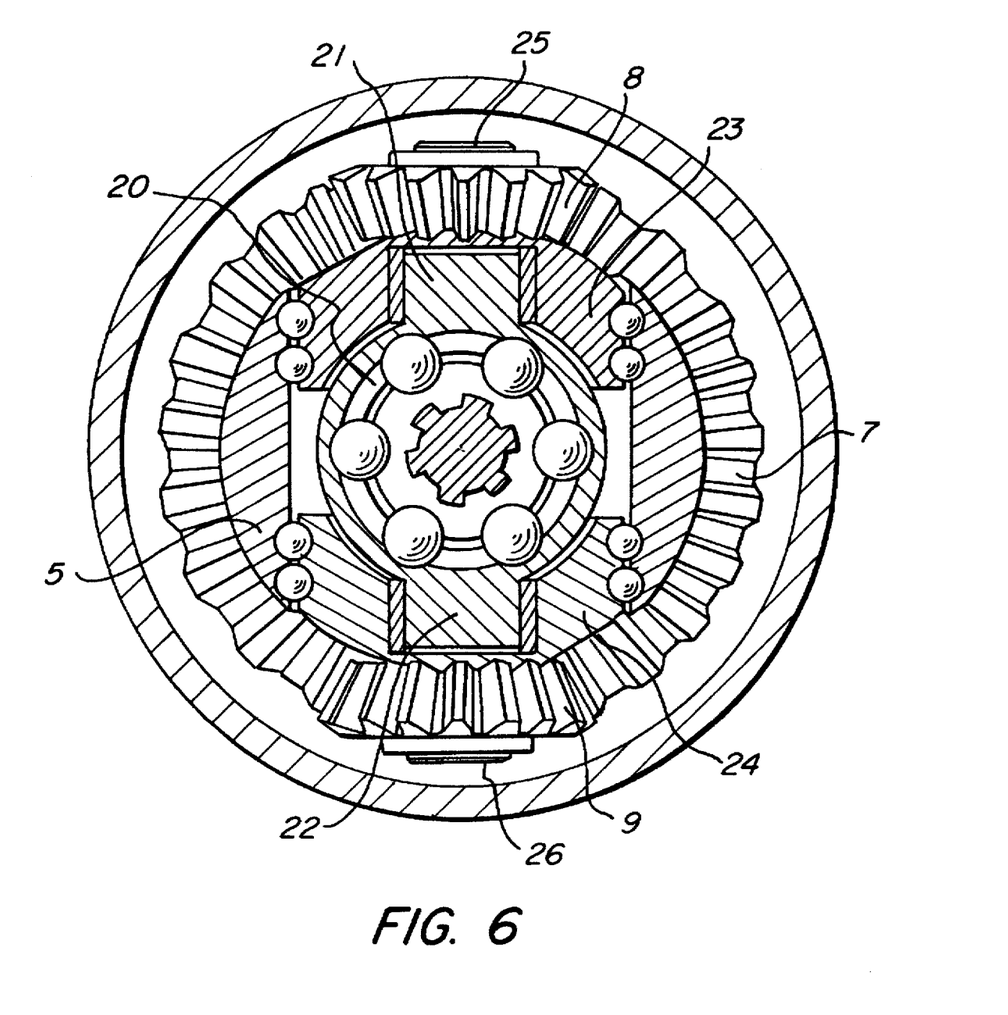
FIG. 6 illustrates a sectional end elevation of the device of FIG. 4, sectioned through line XX'.

Turning now to the alternative embodiment of the present invention as illustrated in FIGS. 4 to 6, like components to the first embodiment have been like numbered.

The gimmal 10 comprises a constant velocity joint 20 splined to the end of the shaft 3 interior of the housing 2. Stub axles 21,22 extend from opposite edges of the constant velocity joint 20. Each stub axle 21,22 is eccentrically and rotatably located in a hub 23,24 which in turn is rotatably mounted in the frame 5.

The pinion gear 8 is fixed mounted to a stub axle 25 projecting from the hub 23, coaxially aligned with its rotational axis. Similarly, the pinion gear 9 is fixed mounted to a stub axle 26 projecting from the hub 24 coaxially aligned with its rotational axis.

Due to the eccentric mounting of the stub axles 21,22 relative to their respective hubs 23,24 the constant velocity joint 20 is tilted to an angle B from the common rotational axis of the pinion gears 8,9.

As the interconnected shafts 17 and 4 rotate the pinion gears 8 and 9 also rotate, being pulled by (or pushing) the frame 5. When the pinion gears 8,9 rotate the hubs 23,24 must also be in rotation, and thus the stub axles 21,22 located within the hubs 23,24 transfers a wobbling action to (or from) the constant velocity joint 20.

When the constant velocity joint 20 rotates, motion in the plane parallel to the shaft 3 is taken up (or produced) by the constant velocity joint 20 itself. However, motion perpendicular to the shaft 3 is transferred to the shaft 3 by the constant velocity joint 20 (or vice versa).

Thus, the shaft 3 imparts, or is imparted with two components, namely, pure rotation, in common with the shaft 4, and also an irregular motion resulting in a controlled dwell period or slight pause in its rotational motion.

It will be apparent that in the described arrangement the constant velocity joint 20 is acting, relative to the shaft 3, purely as a pinned pivot type member.

Thus in some situations it may be desirable to simply replace the constant velocity joint 20 with a pivotable member pinned pivotably directly or indirectly to the shaft 3.

However, it is envisaged that for smaller capacity and sized devices 1 the constant velocity joint 20 will prove more advantageous, as force transfer is spread over the full circumference of the shaft 3.

Figure 7:
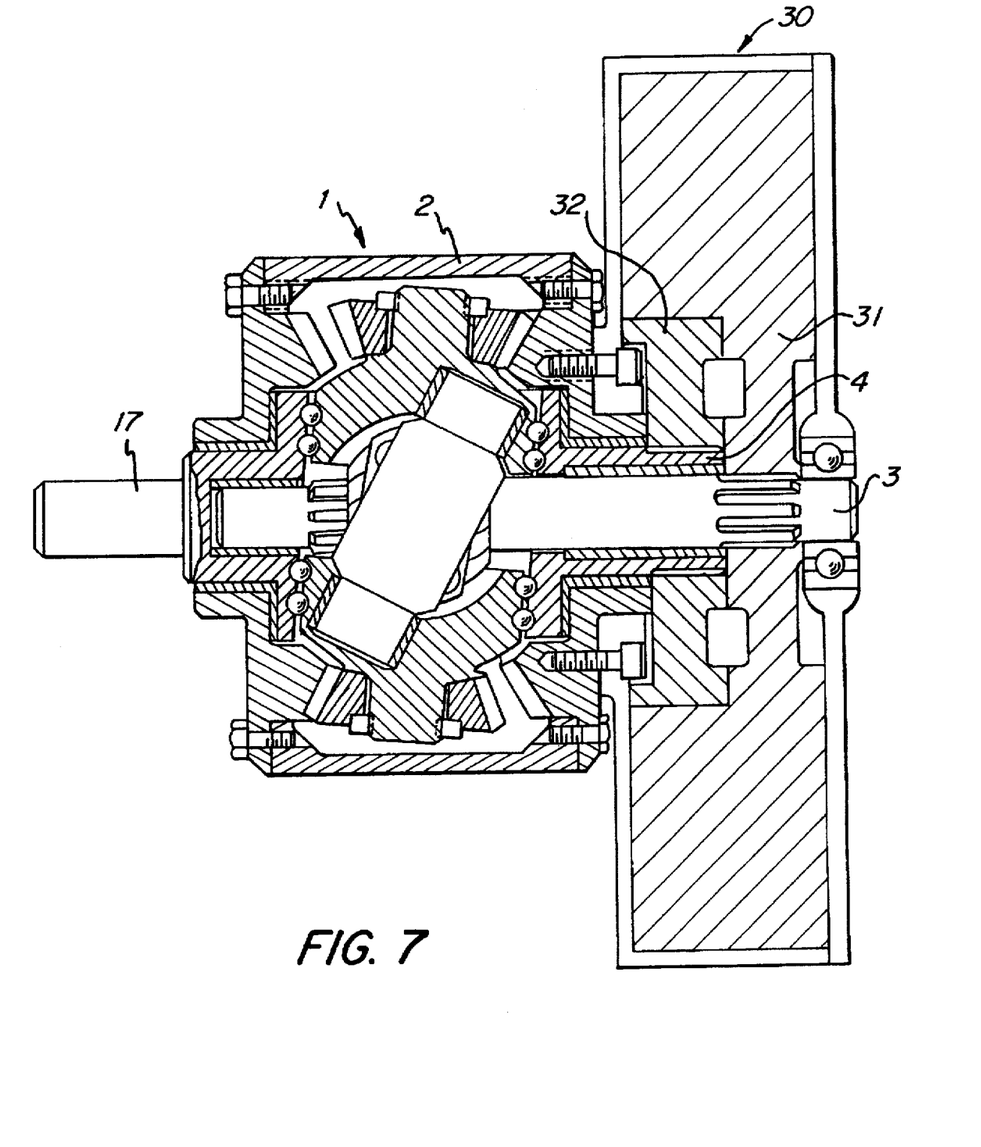
FIG. 7 illustrates the device of FIG. 4 coupled to the piston assemblies (or one piston assembly and one rotor) of a schematically shown rotary machine.
Figure 8:
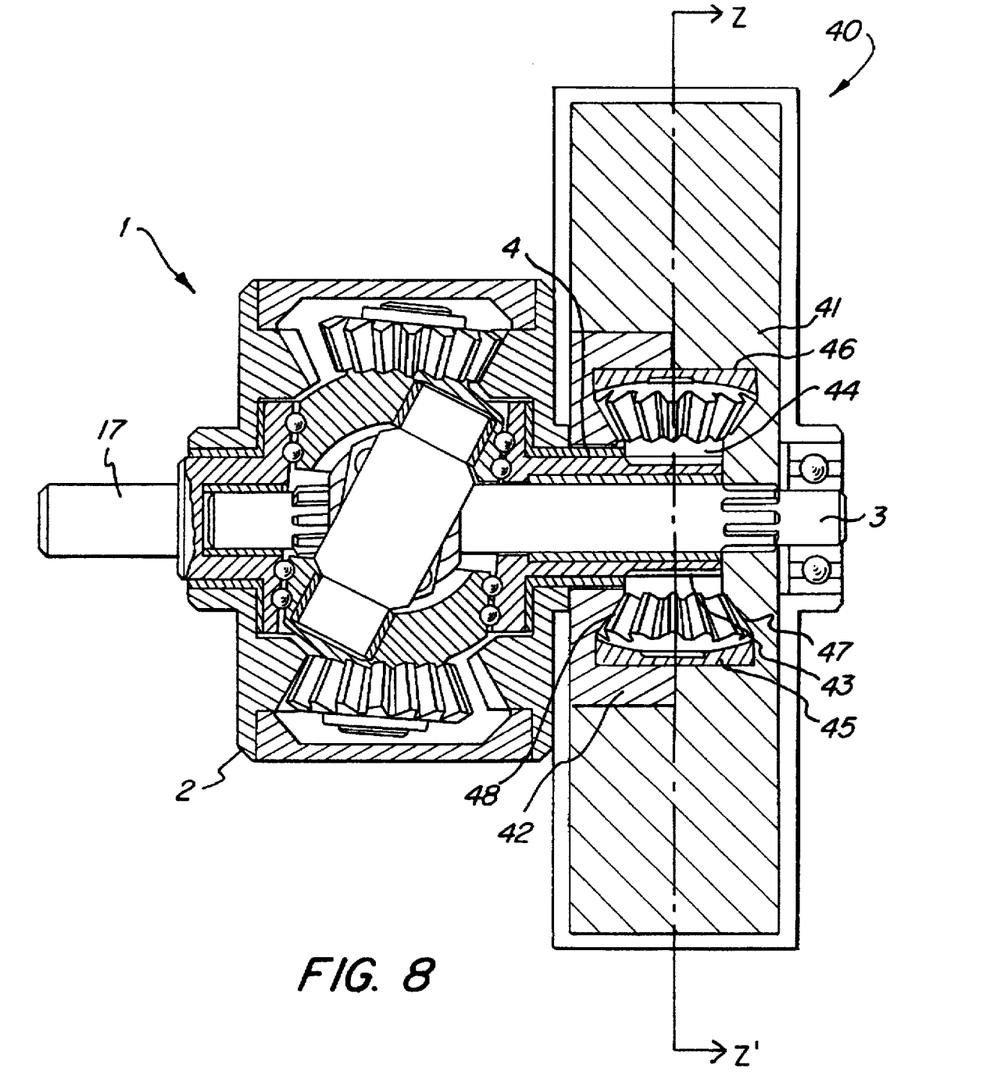
FIG. 8 illustrates the device of FIG. 4 coupled to the piston assemblies (or one piston assembly and one rotor) of a schematically shown rotary machine, utilising a differential arrangement; and, FIG. 9 illustrates an end elevation, pivotably sectioned, of the combination of FIG. 8 viewed at line ZZ'.
Figure 9:
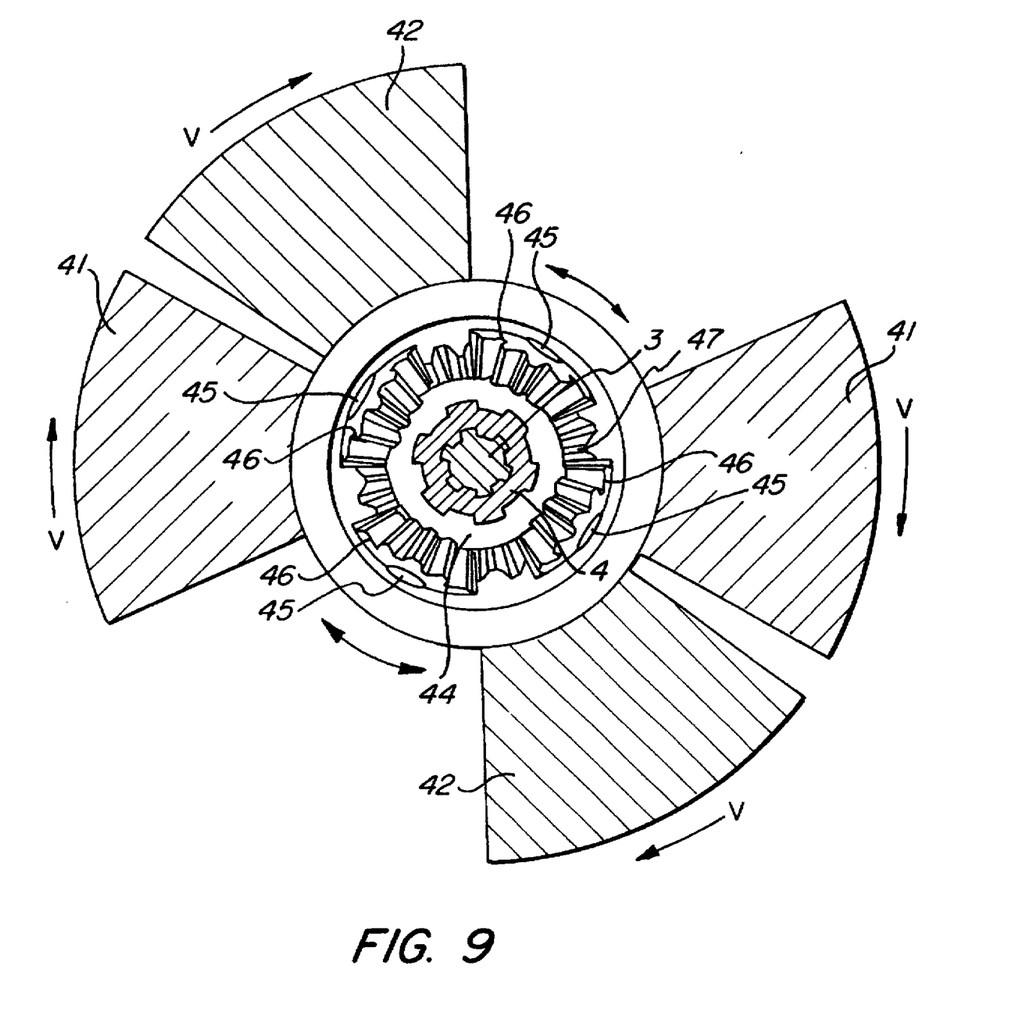

FIGS. 7 to 9 illustrate two different possible configurations of rotary machine using the device 1.

The rotary machine 30 of FIG. 7 has the shaft 3 of the device 1 connected to a first piston assembly 31, and the shaft 4 connected to a second piston assembly 32. In this arrangement the rotary machine 30 will operate under the first action described earlier, namely, the second piston assembly 32 will rotate at a particular angular velocity, while the first piston assembly 31 will oscillate above and below that angular velocity due to the superimposed relative irregular motion created and controlled by the device 1.

In the second configuration the rotary machine 40 of FIGS. 8 and 9 has the shaft 3 of the device 1 connected to a first piston assembly 41. However, unlike the configuration of FIG. 7, the shaft 4 is not directly connected to the other piston assembly 42, but instead terminates in a splined section 43 onto which is mounted a yoke 44. Extending radially outwardly from the yoke 44 at equispaced intervals are four stub axles 45. Mounted on each stub axle 45 is a free wheeling pinion gear 46. Each of the piston assemblies 41,42 have an inwardly facing annular bevel gear 47,48, respectively, thereon with which each pinion gear 46 is in engagement.

The nett arrangement produced is a differential, such that while both piston assemblies 41,42 have a forward angular velocity component V in common, they will also have superimposed thereon an oscillating angular velocity component, 180° out of phase with respect to each other, controlled by the device 1.

Revisiting now the earlier discussion, the angles A and B shown in FIGS. 1 and 4, respectively, represent the magnitude of the irregular rotary motion which can be transferred to one or both of the piston assemblies 31 & 32 (41,42) of the rotary machine 30 (40).

In the drawings A is shown as approximately 60° and B is shown as approximately 25° but could be up to approximately 30°.

It will be apparent that the value of A is equivalent to a value of B calculated as 90°-A. Therefore for FIG. 1 the value equivalent is 30°.

For the embodiment of FIG. 1, in the arrangement of FIG. 7, the magnitude of oscillation of the piston assembly 31 relative to piston assembly 32 would be a total of 60°. Similarly, for the embodiment of FIG. 4 in the arrangement of FIG. 7 the magnitude of relative oscillation of the piston assembly 31 would be a total of 50°. Where each piston assembly 31,32 has two radially opposed vane type pistons each would need to occupy a sector of approximately 59° for the embodiment of FIG. 1 and 64° for the embodiment of FIG. 4 (leaving a gap of 2° between the opposing faces of the pistons of the piston assemblies 31 and 32 and the extremities of the oscillation).

However, in the arrangement of FIGS. 8 and 9 each one of the pistons of a two vaned piston assemblies 41,42 would need to occupy a sector of approximately 29° if incorporating the embodiment of FIG. 1 and 34° if incorporating the embodiment of FIG. 4.

It may prove advantageous in the arrangement of FIG. 7 to in fact have four or some other multiple of two vane type pistons per piston assembly. In that case, for example, each vane piston would need to occupy only half the sector area of a two vane piston assembly.

Clearly if the rotary machine is an internal combustion engine, to obtain the desired two or four stroke operation it may be also necessary to adjust the frequency of the oscillations. This may be achieved by varying the ratio of the number of teeth on the pinion gears 8,9 to the number of teeth on the bevel gears 6,7. However, the ratio should also be a multiple of two.

Where the rotary machine in connection with which the device 1 is used is a pump no problems arise from transmission of torque from the shaft 3 to the shaft 17. However, where the rotary machine is an internal combustion engine or steam engine, so that torque and power is to be into the shaft 3 and out through shaft 17 care must be exercised to ensure that the power stroke occurs at the correct position of the gimmal 10.

Additional advantages of the present invention will become apparent to those skilled in the art after considering the principles in particular form as described with reference to the drawings.

Accordingly, it will be appreciated that changes may be made to the above described embodiments of the invention without departing from the operational and constructional principles taught herein. For example, all of the gears may be spiral bevel generated to improve performance at speed. Further, the pistons or piston assemblies may differ from the vane type pistons and assemblies illustrated.

Finally, it will be understood that this invention is not limited to the particular embodiments described or illustrated, but is intended to cover all alterations, additions or modifications which are within the scope of the appended claims.

I claim:

1. A device in the form of a gearing assembly serving as a control mechanism and primary means for causing motion variance between cooperating shafts suitable for use in conjunction with a rotary machine, the device comprising a stationary housing from which extends first and second shafts, the shafts being coaxial, the device being characterized in that the second shaft terminates in a frame which rotates in company with rotation of the said second shaft, the device further comprising first and second annual bevel gears, which first and second annular bevel gears are fixed mounted to the housing, are coaxially aligned with the first and second shafts, and are spaced apart allowing the frame to be freely rotatable therebetween, first and second pinion gears mounted in the frame, which first and second pinion gears are coaxial, having an axis of rotation offset from the perpendicular to the common axis of the first and second shafts and the first and second annular bevel gears, such that the first pinion gear is in engagement with the first annular bevel gear only and the second pinion gear is in engagement with the second annular bevel gear only, such that when the second shaft and the frame rotate relative to the stationary housing, the first and second pinions are in engagement with their respective annular bevel gear and rotate in the same direction, there being a gimmal mounted in the frame between the pinion gears in engagement with the first shaft to positively cause an irregular motion and a period of dwell in the motion of the first shaft.

2. A device according to claim 1 wherein the gimmal comprises a constant velocity joint mounted on and to the first shaft, the constant velocity joint having a first and second projection, the first projection being eccentrically and rotatably connected to the first pinion gear and the second projection being eccentrically and rotatably connected to the second pinion gear.

3. A device according to claim 2 wherein the first and second projections are aligned on a common axis, which common axis passes through the centre of the constant velocity joint.

4. A device according to claim 3 wherein the angle of eccentricity of the common axis of the first and second projections relative to the rotational axis of the first and second pinion gears is between 5° and 80°.

5. A device according to claim 4 wherein the angle of eccentricity is between 30° and 60°.

6. A device according to claim 4 wherein the angle of eccentricity is between 5° and 40°.

7. A device according to claim 6 wherein the angle of eccentricity is between 15° and 25°.

8. A device according to claim 1, wherein the gimmal includes a partially spherical cam track member fixedly mounted to and between the first and second pinion gears, the partially spherical cam track member including a circular cam track tilted to an angle between the axis of rotation of the first and second pinion gears and the spherical member, and the axis of rotation of the first shaft, the transfer element further including an annular cam follower rotatably mounted in the cam track, the cam follower being pivotably connected to a yoke which in turn is connected to the first shaft.

9. A device according to claim 8 wherein the angle of tilt of the cam track relative to the axis of rotation of the partially spherical cam track member, and thus the first and second pinion gears, is between 10° and 85°.

10. A device according to claim 9 wherein the angle of tilt is between 30° and 60°.

11. A device according to claim 9 wherein the angle of tilt is between 50° and 85°.

12. A device according to claim 9 wherein the angle of tilt is between 55° and 75°.

13. A device according to claim 1 wherein the gimmal comprises a member pivotably pinned to the first shaft, said member having a first and a second projection, the first projection being eccentrically and rotatably connected to the first pinion gear and the second projection being eccentrically and rotatably connected to the second pinion gear.

14. A device according to claim 13 wherein the first and second projections are aligned on a common axis, which common axis passes through the centre of the pivotably pinned member.

15. A device according to claim 14 wherein the angle of eccentricity of the common axis of the first and second projections relative to the rotational axis of the first and second pinion gears is between 5° and 80°.

16. A device according to claim 15 wherein the angle of eccentricity is between 30° and 60°.

17. A device according to claim 15 wherein the angle of eccentricity is between 5° and 40°.

18. A device according to claim 15 wherein the angle of eccentricity is between 15° and 25°.

19. A device according to claim 2, wherein the first and second shafts are concentric, with the second shaft being hollow to rotatably receive the first shaft.

20. A device according to claim 19 wherein the device includes a third shaft, coaxial with the first and second shafts, connected to the frame, which third shaft extends from the side of the frame opposite to the second shaft.

21. A device according to claim 2, wherein the number of teeth on the annular bevel gears is a multiple of the number of teeth on the pinion gears.

22. A device according to claim 21 wherein the annular bevel gears have twice as many teeth as the pinion gears.

23. A rotary machine incorporating a device according to claim 1, the rotary machine being of the "cat and mouse" type.

24. A rotary machine according to claim 23 including two piston assemblies, each having two radially opposed vane type pistons.

25. A rotary machine according to claim 23 wherein the first shaft is connected to one piston assembly and the second shaft is connected to the other piston.

26. A rotary machine according to claim 24, wherein the irregular motion is transferred to or form both piston assemblies, at a 180° phase shift, via a differential arrangement.

27. A rotary machine according to claim 26 wherein the first shaft is connected to one piston assembly and the second shaft terminates in a circular yoke, radially outwardly from which project a plurality of equispaced freewheeling pinion gears, the freewheeling pinion gears being in engagement with two annular bevel gears coaxially mounted, one said annular bevel gear on each of the two assemblies.

28. A rotary machine according to claim 23, wherein the rotary machine is either a pump, an internal combustion engine or a steam engine.

29. A device according to claim 23, wherein the first shaft is connected to one piston assembly, and the other shaft is connected to the other piston.

30. A rotary machine according to claim 23, wherein the irregular motion is transferred to or form both piston assemblies, at a 180° phase shift, via a differential arrangement.

31. A device according to any one of claim 1, wherein the first and second shafts are concentric, with the second shaft being hollow to rotatably receive the first shaft.

* * * * *

UNITED STATES PATENT AND TRADEMARK OFFICE
CERTIFICATE OF CORRECTION

PATENT NO. : 5,676,534
DATED : October 14, 1997
INVENTOR(S) : Donald Clive Hiscock It is certified that error appears in the above-identified patent and that said Letters Patent is hereby corrected as shown below:

At column 2, line 5, delete "GB 1034042" and substitute --GB 1,034,023-- therefor.

At column 2, line 9, delete "GB 1410478" and substitute --GB 1,410,498-- therefor.

At column 7, line 17, delete "transfera" and substitute --transfer a-- therefor.

Signed and Sealed this

Twenty-eighth Day of April, 1998

Attest:

BRUCE LEHMAN

*Attesting Officer*           *Commissioner of Patents and Trademarks*